United States Patent [19]

Roba

[11] Patent Number: 4,735,826

[45] Date of Patent: Apr. 5, 1988

[54] METHOD OF SURFACING THE HEATER OF A FURNACE FOR OPTICAL FIBRE DRAWING

[75] Inventor: Giacomo Roba, Cogoleto, Italy

[73] Assignee: Cselt-Centro Studi e Laboratori Telecomunicazioni S.p.A., Torino, Italy

[21] Appl. No.: 827,271

[22] Filed: Feb. 6, 1986

[30] Foreign Application Priority Data

Mar. 22, 1985 [IT] Italy ............................... 67278 A/85

[51] Int. Cl.$^4$ ....................... B05D 7/22; C23C 16/40
[52] U.S. Cl. .................................. 427/237; 427/255; 427/255.3; 427/372.2
[58] Field of Search ............... 427/237, 230, 255.3, 427/255, 236, 249, 376.1, 376.2, 226, 372.2, 228, 53.1, 38, 314; 204/192 C, 192 SP, 192 D

[56] References Cited

U.S. PATENT DOCUMENTS

| | | | |
|---|---|---|---|
| 3,093,496 | 6/1963 | Demaison et al. | 427/376.2 |
| 3,178,308 | 4/1965 | Oxley et al. | 427/237 |
| 4,042,006 | 8/1977 | Engl et al. | 427/237 |
| 4,117,802 | 10/1978 | Le Sergent et al. | 427/163 |
| 4,539,224 | 9/1985 | Matsuhisa | 427/376.2 |
| 4,576,836 | 3/1986 | Colmet et al. | 427/255.3 |

*Primary Examiner*—Sadie L. Childs
*Attorney, Agent, or Firm*—Karl F. Ross; Herbert Dubno

[57] ABSTRACT

The method of surfacing the heater of a furnace for optical fiber drawing allows elimination of defects in the inner heater surface, which defects give rise to particle emission towards the preform. This is achieved by depositing a thin layer of a mixture of oxides compatible with the material composing the heater.

4 Claims, No Drawings

METHOD OF SURFACING THE HEATER OF A FURNACE FOR OPTICAL FIBRE DRAWING

FIELD OF THE INVENTION

The present invention relates to an apparatus for producing optical fibers for use in telecommunications and, more particularly, to a method of surfacing the heater of a furnace for optical fiber drawing.

BACKGROUND OF THE INVENTION

It is known that for drawing optical fibres, the material composing the preform should be heated to temperatures above 2000° C. (e.g. temperatures of about 2200° C.). These temperatures are generally attained by resistance furnaces or by induction furnaces operating at radiofrequency.

Induction furnaces are preferred because resistance furnaces (and particularly furnaces with a resistive heater made of graphite) need an inert gas to avoid combustion of the resistive heater, are liable to pollute the reaction area because of the reactivity of the heater with the environment, and have reduced life because of the resistive heater wear.

Generally, in induction furnaces the heater is a cylinder of $ZrO_2$ stabilized with $Y_2O_3$. Such a composition is inert, so that it allows operation in air, and has a low thermal conductivity, whereby it ensures a greater stability in the heating area, with a more suitable thermal gradient in axial direction. Moreover the heater is not subjected to wear, hence the thermal conditions are stable and reproducible, so that a good uniformity of the fibers manufactured is achieved.

Especially for the heaters of induction furnaces the problem arises of high energy particle emission towards the converging bottom portion of the preform. That emission may occur due to surface unevennesses which cause localized temperature increases, with sublimation of the heater material, or localized concentration of mechanical stresses.

The emitted particles impinge on the preform surface and readily penetrate it due to its low viscosity. Discontinuities in fiber surface therefore arise, which can constitute localized fracture centers. This reduces the mechanical performance of the fiber and in particular reduces tensile strength. This may result in the need to reject the fiber because it does not pass the first tensile strength test (the so called screening test, in which the fiber is subjected to tensile stresses of 5 to 15N), with consequent economical loss, or may pose the risk of installing fibres which are defective even if they have passed the tests.

The literature has not disclosed until now any solution to this problem. Since the problem depends on the nature of the heater surface, the more obvious solution would seem to be surfacing the heater during manufacture so as to render the surface itself regular and compact. Yet the high temperatures to be attained to modify the surface (zirconia has a melting point of 2715° C.) make it substantially impossible or in any event not advantageous from the economic standpoint to intervene during heater manufacture.

DESCRIPTION OF THE INVENTION

According to the invention, the problem is solved by surfacing the element already produced at least over a region confined to that portion of the inner heater surface where the highest temperatures are attained.

The method according to the invention is characterized in that a thin layer of a coating based on elements compatible with the heating element material is deposited on the inner heater surface.

Preferably the thin layer is deposited on said inner surface in colloidal state and comprises a mixture of oxides obtained by synthesis between metallorganic compounds of said elements and an oxidizing agent, the layer deposited being subjected to a gradual heating until a ceramic compound is formed.

The deposition may take place according to techniques similar to inside chemical vapor deposition (ICVD), by heating a zone of the cylindrical heater and by displacing the hot zone along the heater axis, in the presence of the inside flow of the reactants suitably mixed.

As an alternative, the deposition can be carried out under static conditions, by homogeneously heating the whole heater under such pressure conditions as to confine the mixed vapors within the hollow of the cylindrical heater.

The gradual heating for obtaining the ceramic compound is carried out in inert gas atmosphere, e.g. in an He or Ar atmosphere.

Helium is generally preferred because of its high mobility due to its small atomic radius, which allows it to penetrate readily through the deposited material interstices thereby occupying sites that otherwise could be occupied by unwanted impurities. The high mobility also allows He to become readily evolved when the deposited layer consolidates, thereby eliminating the risk of being incorporated within the structure.

In some cases, the presence of a reactant gas such as $Cl_2$ may be desirable, to improve the purity of the deposited oxides.

The heating step could even be carried out after the heater has been installed in the furnace.

Owing to the kind of deposition, the layer obtained is composed of pure material and is extremely regular, so that the causes of particle emission are eliminated.

A suitable composition for the layer to be deposited is the mixture $ZrO_2$—$ThO_2$—$HfO_2$ in molar percentages of 60, 30, 10 respectively. The characteristics of those oxides, as far as melting and ebullition temperatures Tf, Te are concerned, are the following:

|       | Tf (°C.) | Te (°C.) |
|-------|----------|----------|
| $ZrO_2$ | 2715     | ~5000    |
| $ThO_2$ | 3050     | ~4400    |
| $HfO_2$ | 2812     | ~5400    |

The starting metallorganic compounds for the formation of said oxides are for instance of the kind $MR_4$ or $MR_nX_m$ (n+m=4), where M is Zr or Th of Hf; R is an organic radical and X is a halogen. Particular examples are $Zr(C_2H_5)_2Br_2$ and $Th(OC_3H_7)_4$.

As oxidizing agent, $O_2$ or $CO_2$ or oxygen-containing organic compounds can be used; the only requirement for the latter is that they give volatile reaction products.

The metallorganic compounds used may strongly react with oxygen or air, thus they must be handled with care.

A typical reaction could be $$ZrR_4 + ThR_4 + HfR_4 + 3CO_2 \rightarrow ZrO_2 + ThO_2 + HfO_2 (+\alpha R)$$

It is to be noted that the organic radicals of the three metallorganic compounds may be different from one another and from the produced radical; therefore number $\alpha$ can not be indicated precisely.

It is evident that the above description is given by way of non limiting example only and that variations and modifications are possible without departing from the scope of the invention. Thus, even if specific reference has been made to the oxides, other compounds can also used, such as carbides, borides, nitrides or, generally, any refractory compound of the elements concerned which compounds meet the above requirements. Also, other techniques can be used instead of chemical vapor deposition, such as sputtering, ion implantation, $CO_2$-laser activation. Obviously, also heaters of different type, for instance resistance heaters, could be surfaced.

I claim:

1. A method of surfacing a heater of a furnace for optical fiber drawing wherein the heater is an inductive or resistance heater composed of a material reactive with the environment or tending to emit high-energy particles in use, said method comprising coating the heater with a thin layer of a ceramic substance which is vapor synthesized and vapor deposited and is composed of oxides of elements compatible with material of said heater whereby said thin layer prevents reaction of said material with the environment, said coating being applied by:

heating an internal surface of said heater to a deposition temperature for said substance;

maintaining in contact with the heated internal surface of said heater a reaction mixture of at least one metallo-organic compound of said elements and an oxidizing agent from which said substance is formed in a vapor-phase reaction; and providing pressure conditions which keep the reaction mixture in a vapor state in contact with said heated internal surface until the coating is formed.

2. The method defined in claim 1 wherein the thin layer after deposition on the inner heater surface is subjected to a gradual heating until a ceramic compound is formed therefrom.

3. The method defined in claim 1 wherein said metallo-organic compound is $$MR_n$$

or $$MR_{n-m}X_m$$

where M is said element and has a valence n, R is an organic radical, X is a halogen, m is a number less than n, said oxidizing agent being selected from the group which consists of $O_2$, $CO_2$ or an oxygen-containing organic compound which gives volatile reaction products with metallo-organic compounds in addition to said substance.

4. The method defined in claim 1 wherein said material is $ZrO_2$ stabilized with $Y_2O_3$, said substance being a mixture of $ZrO_2$, $ThO_2$, and $HfO_2$.

* * * * *